US007785476B2

(12) United States Patent
Newman

(10) Patent No.: US 7,785,476 B2
(45) Date of Patent: Aug. 31, 2010

(54) PROTEIN SKIMMER WITH STATIONARY FAN

(75) Inventor: Daniel A. Newman, Salem, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 0 days.

(21) Appl. No.: 12/378,160

(22) Filed: Feb. 10, 2009

(65) Prior Publication Data

US 2009/0200242 A1   Aug. 13, 2009

Related U.S. Application Data

(60) Provisional application No. 61/065,677, filed on Feb. 13, 2008.

(51) Int. Cl.
*C02F 1/24* (2006.01)
*A01K 63/04* (2006.01)

(52) U.S. Cl. ............... 210/703; 210/221.2; 210/167.23; 119/263; 119/264

(58) Field of Classification Search ............... 210/703, 210/221.2, 167.23; 119/263, 264
See application file for complete search history.

(56) References Cited

U.S. PATENT DOCUMENTS

| 4,764,311 A | 8/1988 | Klaes |
| 5,078,867 A | 1/1992 | Danner |
| 5,084,164 A | 1/1992 | Del Rosario |
| 5,380,160 A | 1/1995 | Chen |
| 5,562,821 A | 10/1996 | Gutierrez-Collaza |
| 5,736,034 A * | 4/1998 | Phillips et al. .......... 210/167.26 |
| 6,156,209 A | 12/2000 | Kim |
| 6,436,295 B2 | 8/2002 | Kim |
| 6,732,675 B1 * | 5/2004 | Liao ........................ 119/259 |
| 6,808,625 B1 | 10/2004 | Wu |
| 7,294,257 B2 | 11/2007 | Jackson |
| 2007/0069403 A1 | 3/2007 | Schletz et al. |
| 2007/0193955 A1 | 8/2007 | Nelson |
| 2007/0193956 A1 | 8/2007 | Nelson |

FOREIGN PATENT DOCUMENTS

| DE | 3918213 A1 * | 12/1990 |
| JP | 05146236 A * | 6/1993 |
| WO | WO 2005/033019 A1 | 4/2005 |

* cited by examiner

*Primary Examiner*—Thomas M Lithgow
(74) *Attorney, Agent, or Firm*—Merchant & Gould P.C.

(57) ABSTRACT

A protein skimmer having a water column chamber and a fixed deflector. The fixed deflector including a plurality of blades that impart a swirling action on water flowing through the deflector. The deflector further providing an even distribution of bubbles within the water column chamber during protein filtering operation. The deflector including a central hub that aids in maintaining the velocity of water flowing through the deflector.

17 Claims, 9 Drawing Sheets

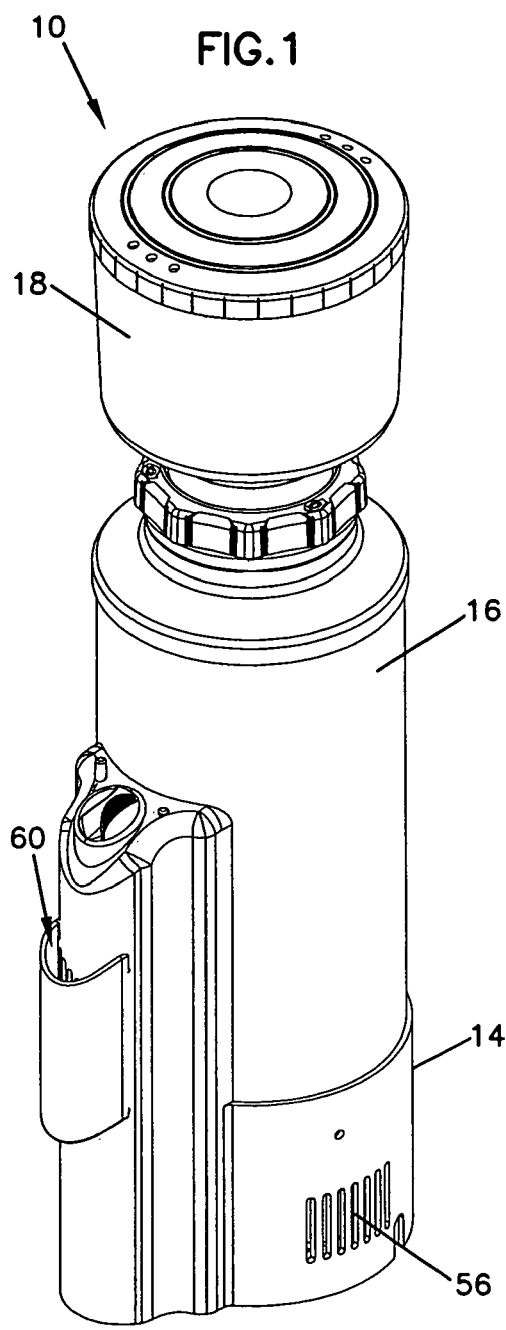
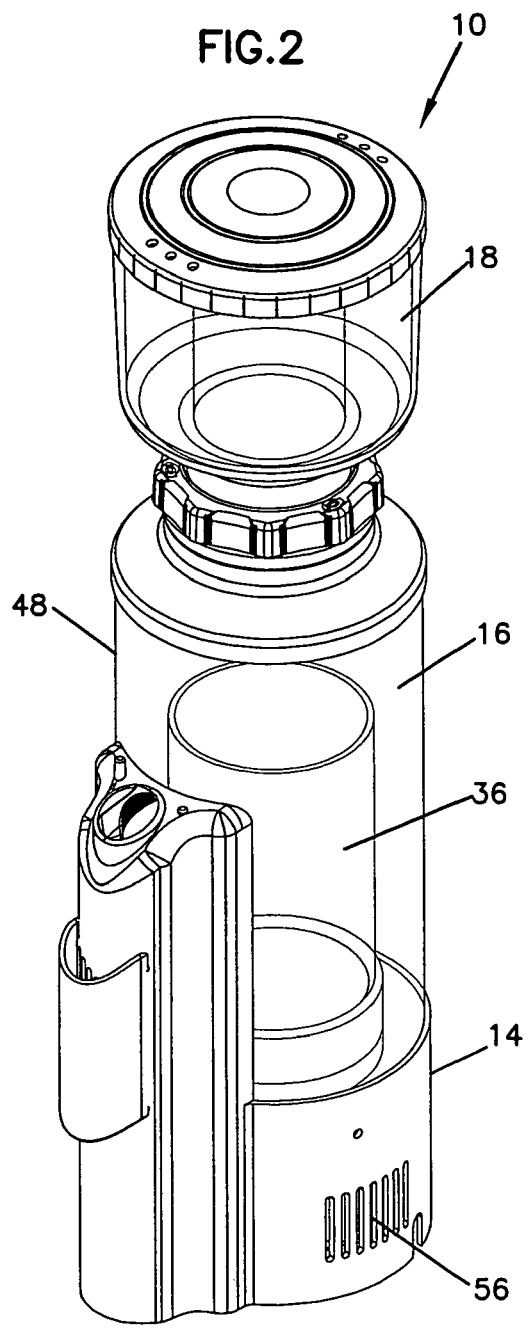

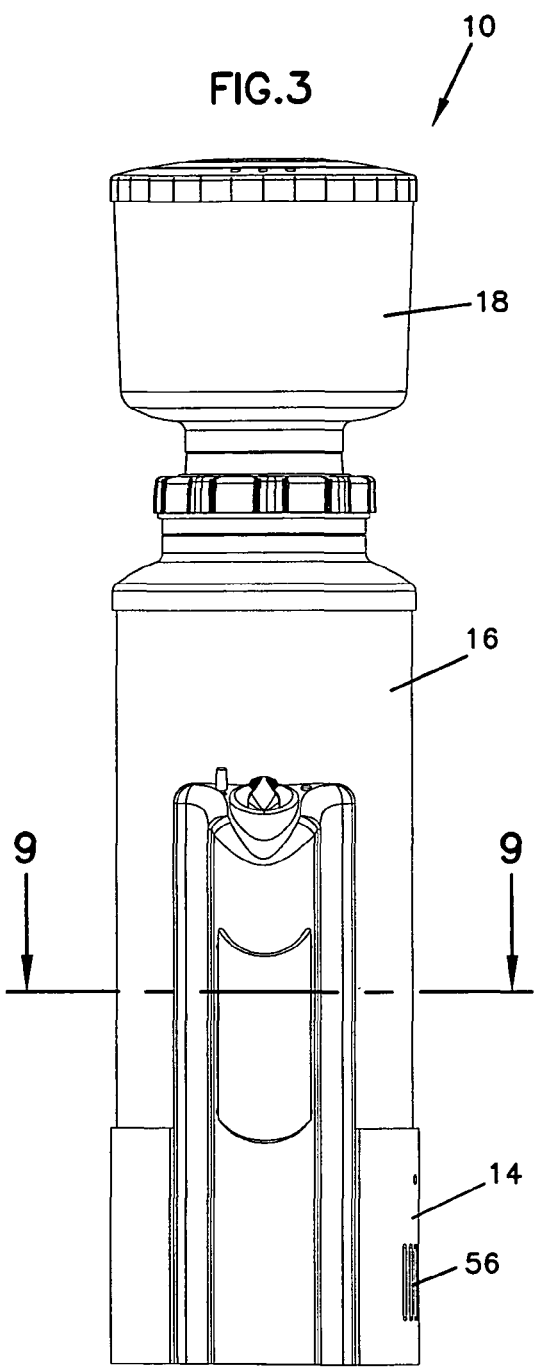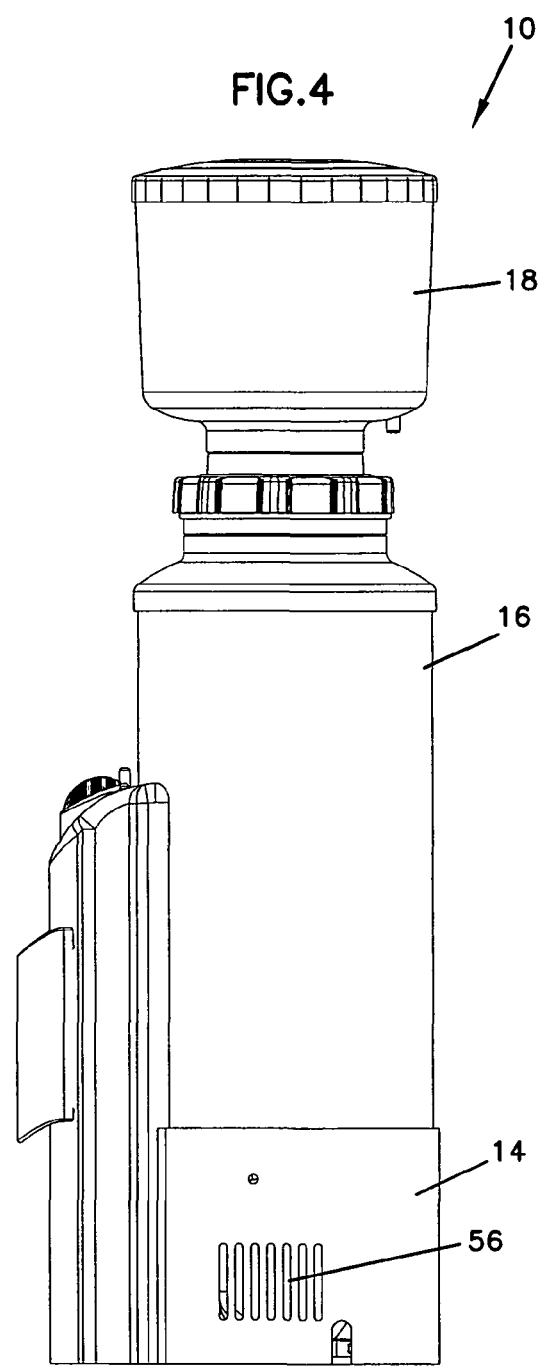

PROTEIN SKIMMER WITH STATIONARY FAN

CROSS-REFERENCE TO RELATED APPLICATIONS

This application claims the benefit of U.S. Provisional Application Ser. No. 61/065,677, filed Feb. 13, 2008; which application is incorporated herein by reference.

TECHNICAL FIELD

The present disclosure relates to bubble-type protein skimmers, which are commonly used with aquariums, and various methods associated with the removal of protein from aquarium water.

BACKGROUND

Protein skimmers are often used in aquarium applications to remove or filter protein suspended in aquarium water. During operation of a protein skimmer, air bubbles are used as a vehicle to remove the protein from the water. Protein that is suspended in the water collects on the surface of the bubbles as the bubbles move through the water. Subsequently, the protein-covered bubbles are skimmed off the surface of the water.

The effectiveness of the protein removal process is in part dependent on the magnitude of the contact area between the surface of the bubbles and the water. Therefore, increasing the number of bubbles in the water and/or the size of the bubbles generally increases the effectiveness of the protein filtering. The effectiveness of the protein filtering is also in part dependent on the time in which the bubbles are in contact with the water, i.e., the dwell time of the bubbles in the water. Slowing down the natural vertical rise of the bubbles in the water therefore also generally increases the effectiveness of the protein filtering.

Though many improvements in protein skimmers have been made over the years, further improvements are desirable. For example, it is especially desirable to provide an improved protein skimmer that is more effective and efficient in removing protein, less complex and more reliable, and less noisy and more energy efficient.

SUMMARY

The present disclosure relates to an improved protein skimmer, an associated method, and improved skimmer components. One embodiment of the protein skimmer includes one or more fixed blades that are configured to cause water to swirl during use. A method of protein filtering including the step of passively swirling water is also provided.

BRIEF DESCRIPTION OF THE FIGURES

FIG. 1 is a perspective view of a protein skimmer which embodies principles of the present disclosure;

FIG. 2 is another perspective view of the protein skimmer of FIG. 1;

FIG. 3 is a front elevation view of the protein skimmer of FIG. 1;

FIG. 4 is a side elevation view of the protein skimmer of FIG. 3;

DETAILED DESCRIPTION

Figure 5:
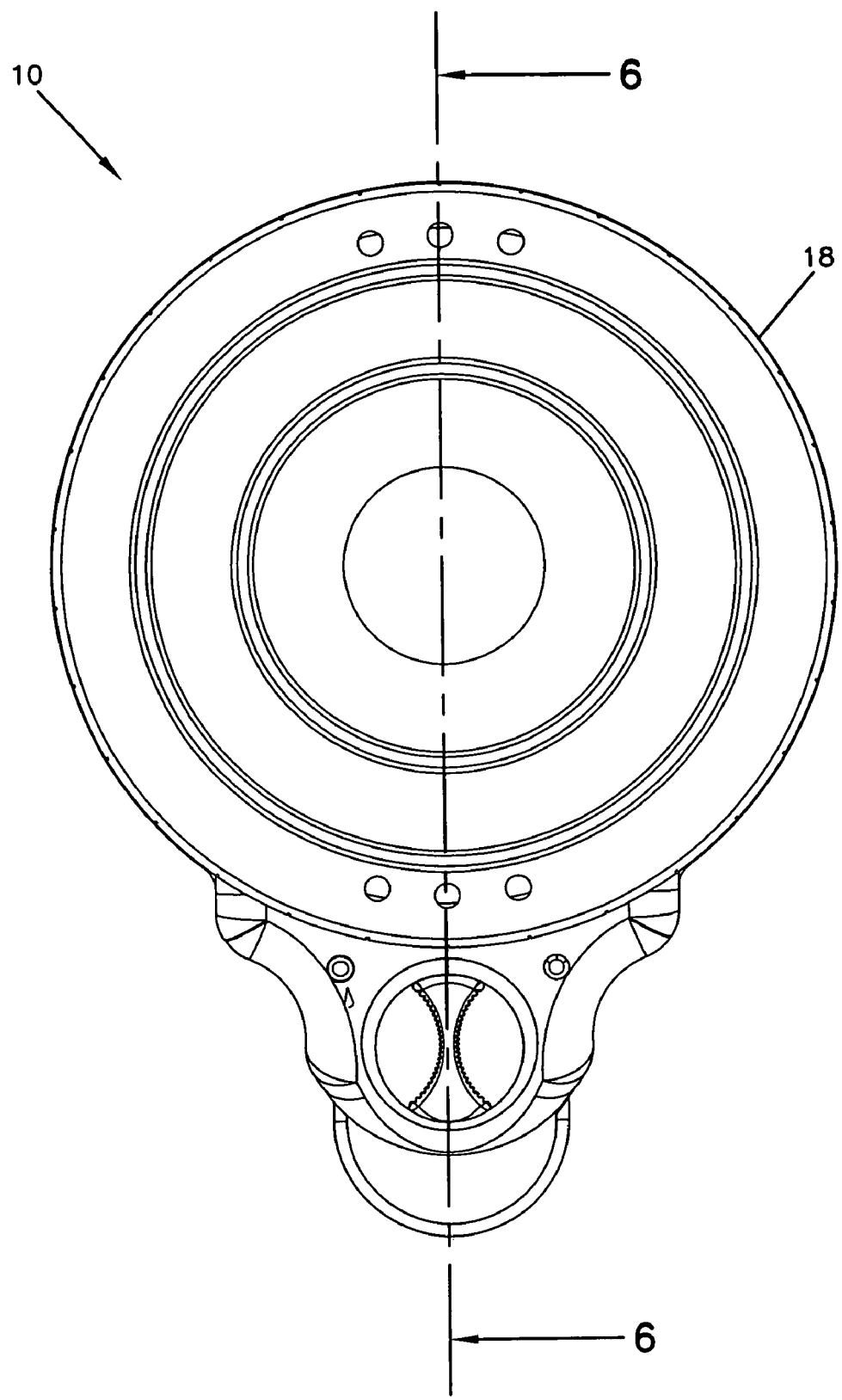
FIG. 5 is a top plan view of the protein skimmer of FIG. 3.
Figure 6:
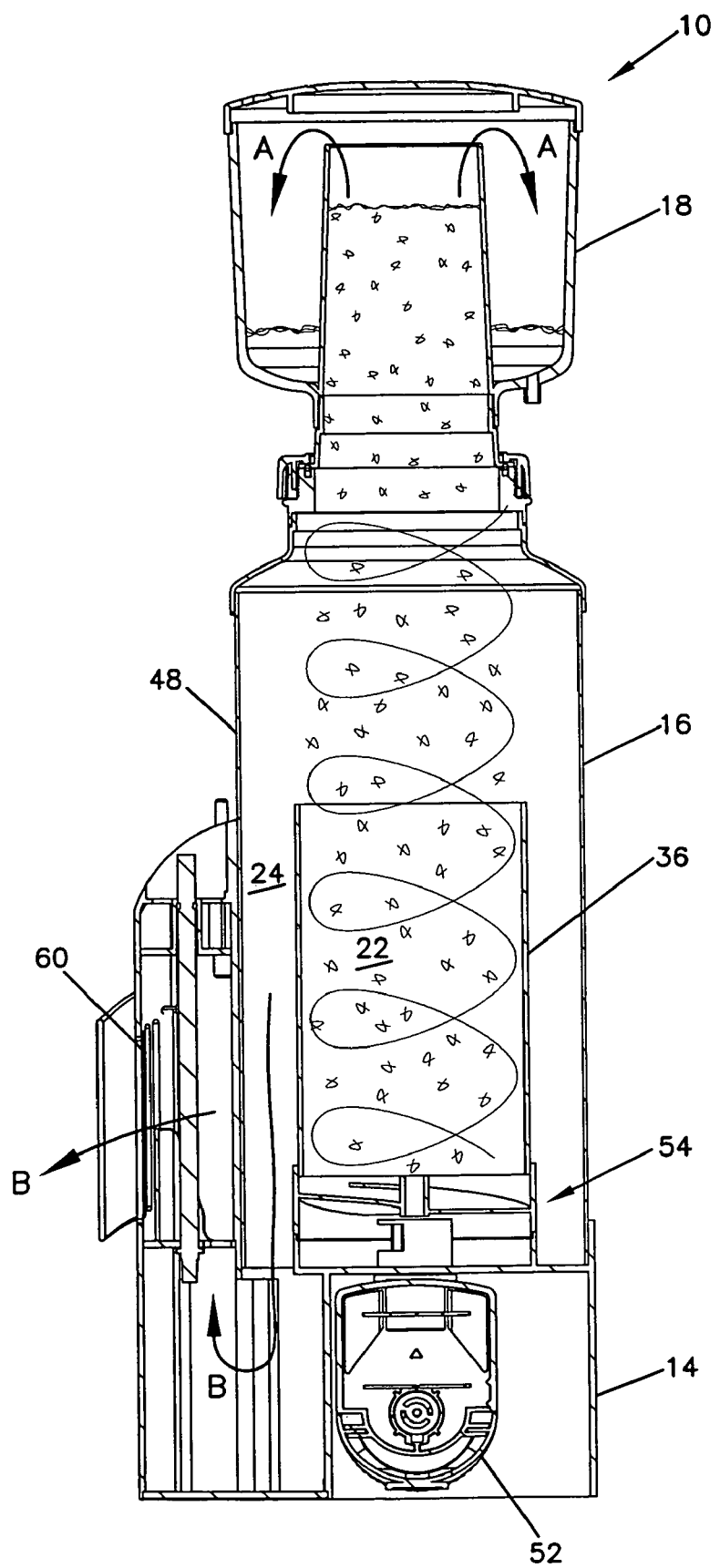
FIG. 6 is a cross-sectional view of the protein skimmer of FIG. 5, taken along line 6-6.

Referring to FIGS. 1-11, an aquarium protein skimmer 10 employing the principles disclosed is illustrated. While the disclosed skimmer 10 is described below in use with aquarium tanks, the skimmer can be utilized in other applications, such as a pond application, for example.

Referring to FIGS. 1-4, the protein skimmer 10 generally includes a base 14 that supports a main body 16. The main body houses a inner reaction chamber 22 (FIG. 6) and a outer return chamber 24, which chambers 22, 24 are coaxially arranged. A collection region, e.g., a collection cup 18, is positioned above the reaction chamber 22.

Figure 7:
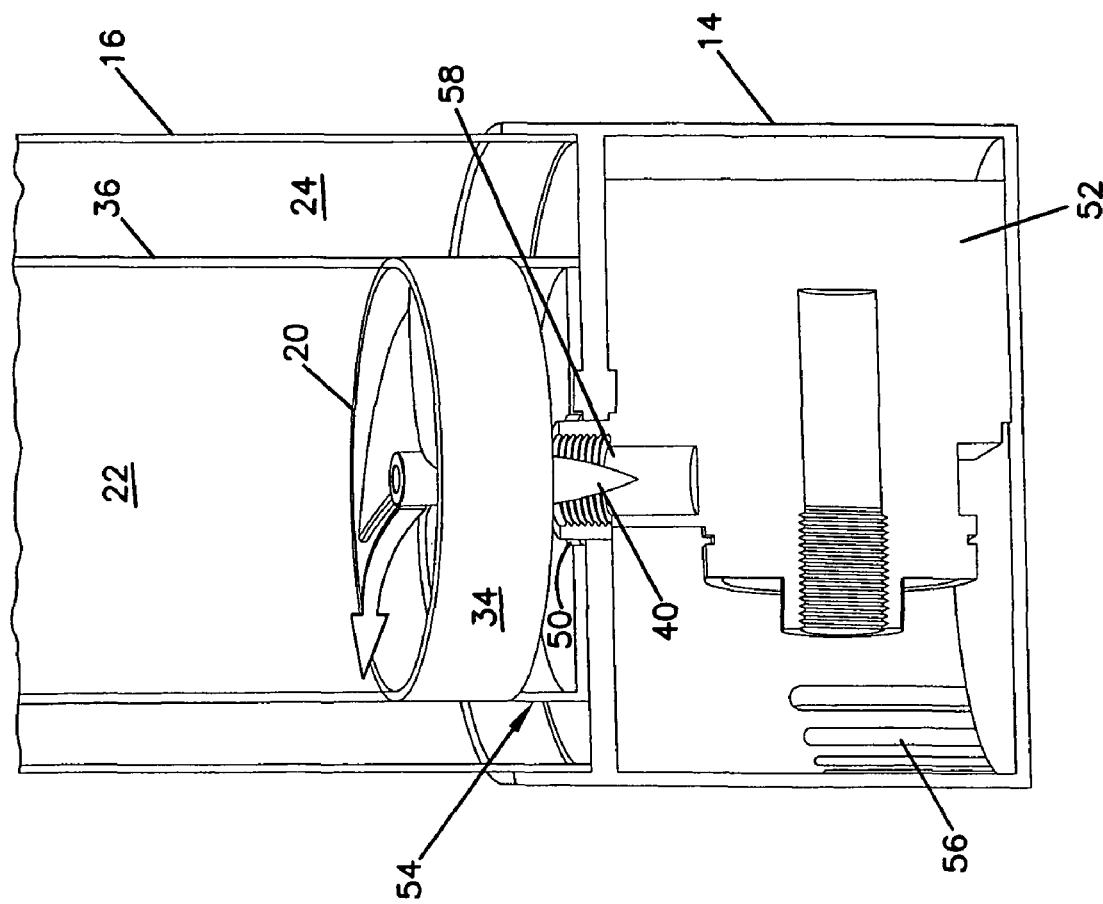
FIG. 7 is a perspective, sectional view of a lower portion of the protein skimmer of FIG. 1 illustrating a deflector arrangement.

In operation, a pump 52 (see FIGS. 6-7 and 10-11) draws in aquarium water through an inlet 56 (e.g., vents or openings) formed in the base 14 of the skimmer 10. Air is infused into the incoming water by a venture and needle wheel impeller (not shown) of the pump 52. Referring to FIG. 7, the air-infused or aerated water is pumped from the skimmer inlet 56 to a pump outlet 58; the stream of aerated water then passes through a fixed fan or deflector 20, and into the reaction chamber 22.

As will be described in greater detail hereinafter, the geometry of the deflector 20 forces the aerated water on a swirling pathway that serves to thoroughly fill the cross-sectional area of the reaction chamber 22 with bubbles. The bubbles not only rise within the water column of the reaction chamber 22, but also swirl due to the inertia imparted on the water exiting the deflector 20. The swirling action imparted on the water and bubbles allows more proteins to attach to the bubbles because the bubbles travel a greater distance through the water column, as opposed to simply rising straight up to the water surface. The protein-covered bubbles are collected with the collection cup 18 until disposed of by the user.

Referring back to FIGS. 2 and 6, the reaction chamber 22 of the skimmer 10 is defined by an inner cylindrical wall 36 that is coaxially arranged in relation to an outer cylindrical wall 48 of the main body 16. In the depicted embodiment, the base 14 is configured to receive the pump 52, which forces the aerated water into the reaction chamber 22. As the protein-covered bubbles rise, the bubbles aspirate and are eventually collected with the cup 18, as shown by arrows A in FIG. 6. The protein filtered water, generally within the outer return chamber 24 region, flows by gravity feed through an outlet 60 of the skimmer (shown by arrows B in FIG. 6) and returned to the aquarium.

Referring now to FIGS. 6-9, the deflector 20 of the present disclosure is positioned at a lower end or water inlet end 54 of the reaction chamber 22. The deflector 20 causes the aerated water to swirl as it moves up through the reaction chamber 22 by imparting a sideward or substantially horizontal water flow. The sideward, horizontal flow in combination with a natural vertical rise causes a rotational or swirling flow within the reaction chamber 22. The deflector 20 is fixed, i.e., stationary, thereby passively causing the swirling flow action. As previously described, the swirling action lengthens the flow pathway and increases the distance that the bubbles travel within the reaction chamber 22. The extend travel distance accordingly decreases the vertical speed at which the bubbles rise within the reaction chamber 22 and increases the dwell time of the bubbles within the reaction chamber 22. This swirling action thereby desirably increases the reaction time between the bubbles and the protein in the water of the reaction chamber 22 to improve the efficiency of protein removal.

Figure 8:
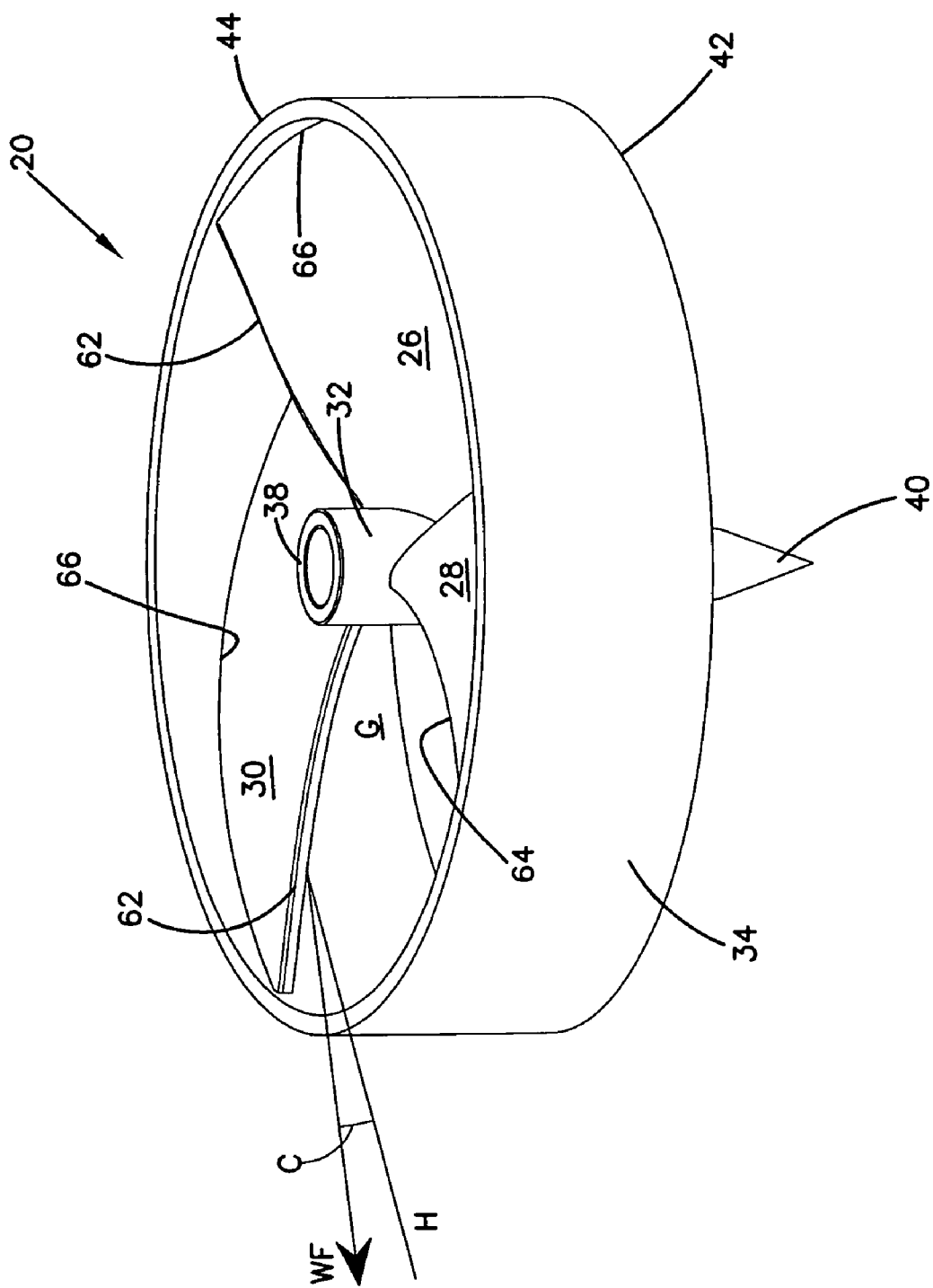
FIG. 8 is a perspective view of a deflector of FIG. 7.
Figure 9:
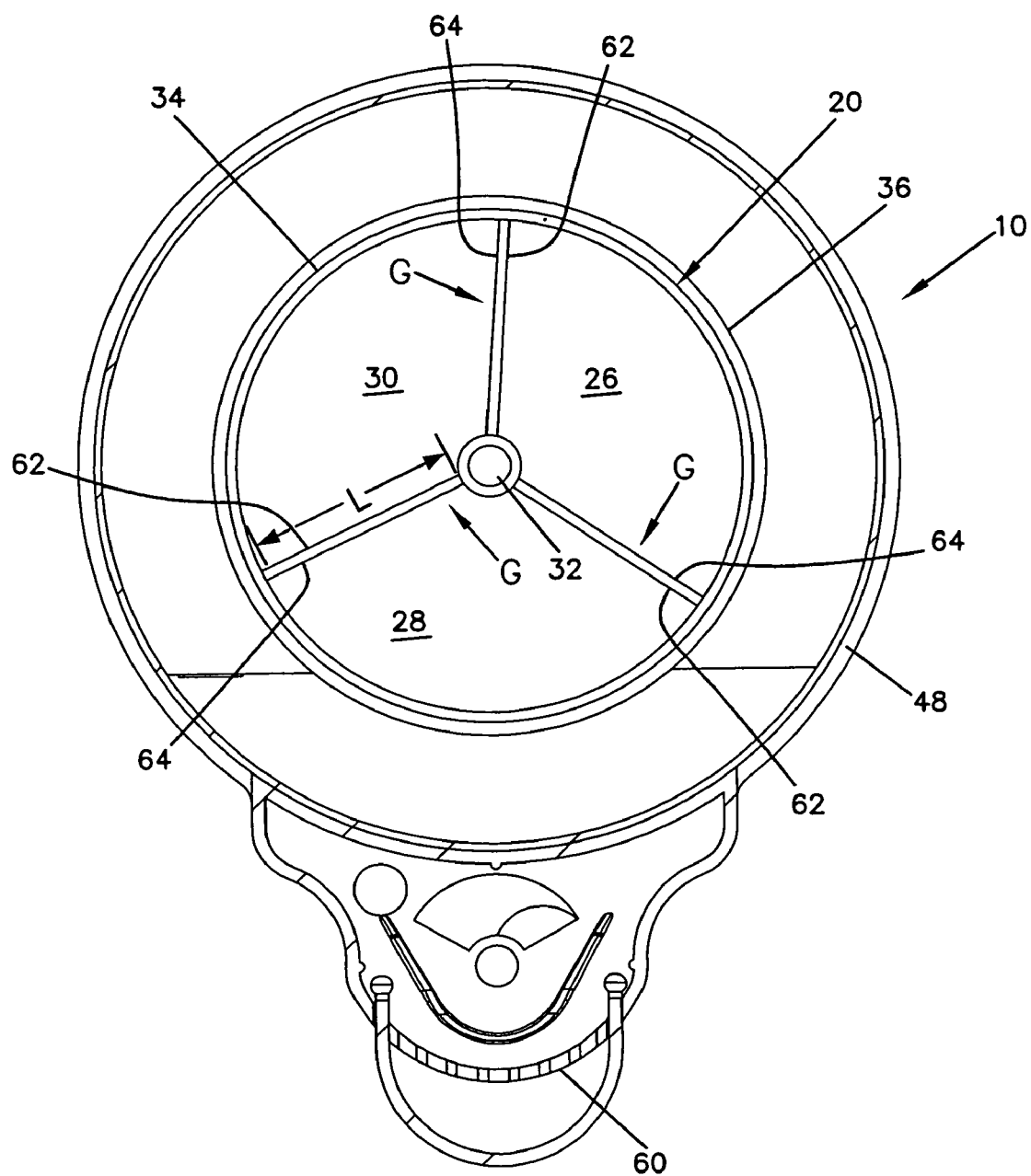
FIG. 9 is a cross-sectional view of the protein skimmer of FIG. 3, taken along line 9-9.
Figure 10:
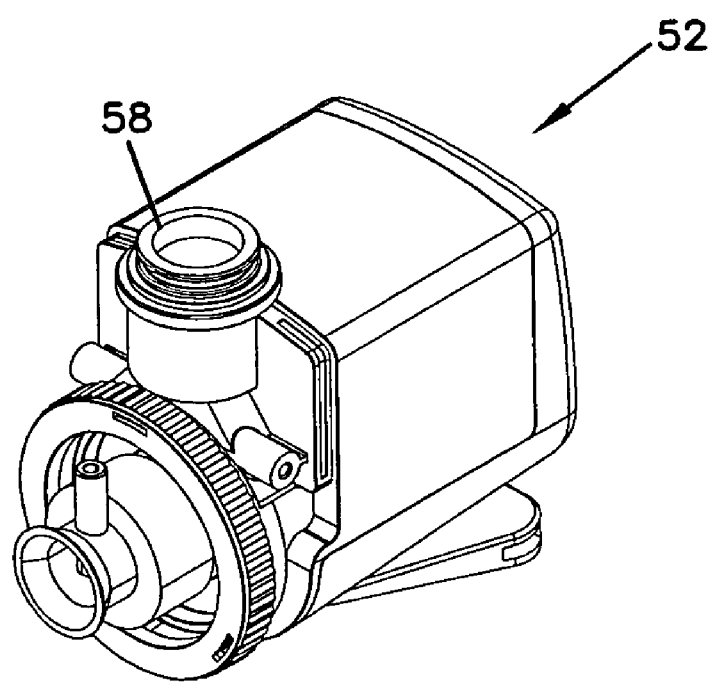
FIG. 10 is a perspective view of a motor of the protein skimmer of FIG. 1, shown in isolation.
Figure 11:
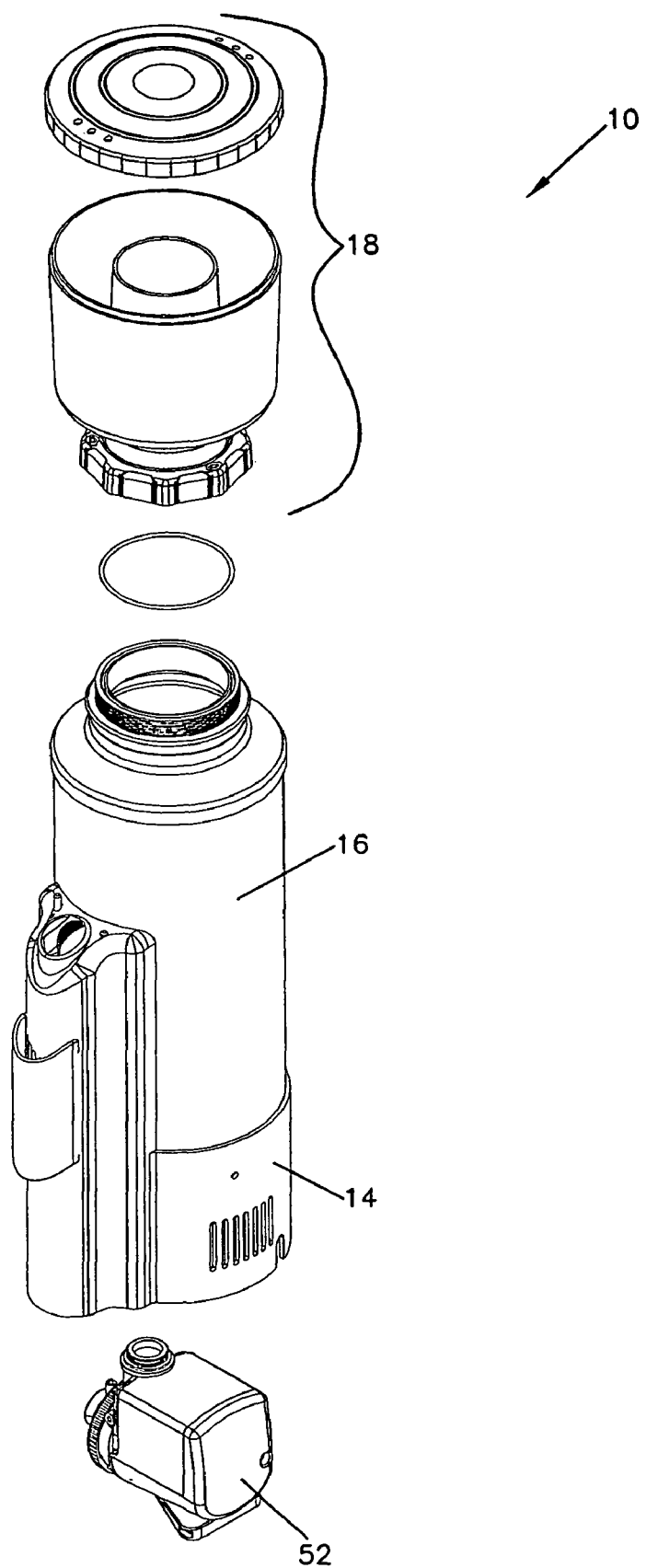
FIG. 11 is an exploded assembly view of the protein skimmer of FIG. 1.

Referring now to FIGS. 8 and 9, the deflector 20 of the present skimmer generally includes a central hub 32 and a periphery support structure 34. In the illustrated embodiment, the periphery support structure 34 is circular. The circular periphery support structure 34 is concentrically oriented relative to the cylindrical wall 36 that defines the reaction chamber 22, and the hub 32 is generally centered within the reaction chamber 22.

Three curved fan blades 26, 28, 30 extend between the hub 32 and the periphery support structure 34. In the illustrated embodiment, the fan blades 26, 28, 30 are attached to each of the hub 32 and the periphery support structure 34. The fan blades 26, 28, 30 each generally have an upper leading edge 62, a lower trailing edge 64, and an interconnecting curved edge 66. The interconnecting curved edge 66 corresponds to the circular shape of the periphery support structure 34. A gap G (FIG. 8) is provided between the upper leading edge 62 and the lower trailing edge 64 of adjacent blades. In one embodiment, the blades do not overlap one other, as illustrated in FIG. 9, however in other embodiments the blades can incorporate an overlapping design.

The angular orientation and the rise of the curved edge 66 are designed to create a substantially horizontal water flow pathway. That is, the blades are designed to re-direct incoming water from a vertical flow to a substantially horizontal flow. The horizontal water flow pathway in combination with the vertical rise of aerated water in the reaction chamber 22 creates the swirling action. In one embodiment, the water flow WF (FIG. 8) exits the gaps G of the deflector 20 in a substantially horizontal direction. In another embodiment, the water flow WF exits the gaps of the deflector at an angle C relative to horizontal H, the angle C being less than 10 degrees.

Referring again to FIGS. 7 and 8, the hub 32 of the deflector 20 includes a blunt end 38 and a pointed or tapered end 40. The tapered end 40 extends or points in an upstream direction, i.e., a direction from which water flows. The tapered end 40 extends below a bottom edge 42 of the periphery support structure 34. It is desirable to maintain sufficient velocity of the stream of aerated water flowing to the reaction chamber 22 to ensure that the stream of water has enough inertia to continue along the swirling pathway created when the aerated water contacts the deflector 20. The tapered end 40 of the central hub 32 helps to maintain the velocity of the aerated water and guides the aerated water toward the blades 26, 28, 30.

In the depicted embodiment the stream of aerated water enters the reaction chamber 22 via a water inlet or center hole 50 adjacent to a bottom of the reaction chamber 22. The deflector 20 is positioned at the water inlet end 54 of the reaction chamber 22 such that the tapered end 40 of the deflector 20 extends into the center hole 50. More specifically, the tapered end 40 extends through the center hole 50 into the outlet 58 of the pump 52 so as to provide an extended guiding surface that aids in maintaining water velocity through the deflector 20.

The present skimmer further improves the efficiency of protein removal by providing an even distribution of bubbles in the water column of the reaction chamber 22. It is desirable that the water in the reaction chamber 22 interact with the bubbles in a generally uniform manner. That is, it is not typically desirable for a disproportionate amount of bubbles to travel up the center of the reaction chamber 22. If the bubbles are not sufficiently uniformly distributed within the reaction chamber 22, some of the water may pass through the protein skimmer 10 without being sufficiently filtered, thereby decreasing the overall efficiency and effectiveness of the protein skimmer 10. In the present embodiment, the deflector 20 is constructed to evenly distribute the bubbles within the reaction chamber 22.

In particular and referring to FIG. 9, the gaps G through which water flows into the reaction chamber 22 are evenly spaced around the cross-sectional area of the reaction chamber; e.g., spaced 120 degrees apart from one another. The gaps G also have a radial length L extending from the central hub 32 to the periphery support structure 34. Bubbles exit all three evenly spaced gaps and exit along the radial lengths of the gaps. The evenly spaced gaps G in combination with the substantially horizontal water flow WF along the radial lengths of the gaps fills the reaction chamber 22 with bubbles in a uniform matter.

As previously described, the deflector 20 of the presently disclosed skimmer is fixed or stationary. Accordingly, the distribution of the bubbles by the defector 20 can be characterized as a passive distribution in contrast to an active distribution. Likewise, the swirling action is passively imparted upon the water flow. The fixed deflector arrangement eliminates the complexity and wear associated with moving or rotating parts used in some conventional skimmer arrangements to impart water movement and bubble distribution. Eliminating the necessity of moving or rotating parts provides the user with a more reliable arrangement that requires less mechanical maintenance. The fixed deflector arrangement is also less noisy and is more energy efficient than conventional skimmers having moving or rotating parts.

It should be appreciated that many other defector 20 configurations are possible that are still within the scope of this disclosure. For example, deflectors in alternative embodiments may include more or less than three fixed blades, the blades can have different profiles than the one depicted, the blades can be oriented at different angles than shown and described above, and the blades can be configured to be connected only at the periphery or only at the center or not connected at all. Moreover, the deflector in alternative embodiments may or may not include a tapered central hub.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A protein skimmer, comprising:
a reaction chamber having a water inlet end; and
a deflector fixedly positioned at the inlet end, the deflector including a plurality of blades that causes water entering the reaction chamber to swirl, each blade having a vertical rise of less than about 10 degrees, the vertical rise imparting a substantially horizontal flow upon water passing through the deflector.

2. The protein skimmer of claim 1, wherein the deflector has a central hub, each blade of the plurality of blades being connected to the central hub.

3. The protein skimmer of claim 2, wherein the central hub includes a tapered end that extends in an upstream direction.

4. The protein skimmer of claim 3, further including a pump having an outlet that directs water flow through the deflector, the tapered end of the central hub being generally centrally located within outlet of the pump.

5. The protein skimmer of claim 1, wherein the reaction chamber is defined by a cylindrical wall, wherein the deflector has a circular periphery structure, and wherein circular periphery structure of the deflector and the cylindrical wall are concentrically arranged.

6. The protein skimmer of claim 5, wherein the deflector has a central hub, each blade of the plurality of blades having a proximal end connected to the central hub and a distal end connected to the circular periphery structure.

7. The protein skimmer of claim 6, wherein the central hub includes a pointed end that extends in an upstream direction.

8. The protein skimmer of claim 1, further including a collection cup located above the reaction chamber, wherein proteins in the swirling water attach to rising bubbles and are collected within the collection cup.

9. The protein skimmer of claim 8, further including a pump that forces air-infused water through the fixed deflector.

10. The protein skimmer of claim 1, wherein the plurality of blades includes stationary curved blades.

11. The protein skimmer of claim 10, wherein each of the stationary curved blades is defined in part by a curved edge that rises between a first end attached to a central hub and a second end.

12. The protein skimmer of claim 1, wherein water enters the reaction chamber through gaps defined by the blades of the deflector, the gaps being evenly spaced around the cross-sectional area of the reaction chamber.

13. The protein skimmer of claim 12, wherein the gaps are spaced at 120 degree intervals around the cross-sectional area of the reaction chamber.

14. A method of removing protein from water, the method comprising the steps of:
provviding a skimmer arrangement having a water column chamber and a fixed deflector, the fixed deflector including blades, each blade having a vertical rise of less than about 10 degrees; and
moving a stream of aerated water through the blades of the fixed deflector, thereby causing the stream of aerated water to swirl within the water column chamber, wherein the vertical rise of the blades imparts a substantially horizontal flow direction upon water passing through the fixed deflector.

15. The method of claim 14, further including distributing the stream of aerated water evenly across the cross-sectional area of the water column chamber.

16. The method of claim 14, further including collecting protein-covered air bubbles within a collection cup located above the water column chamber.

17. The method of claim 14, wherein the step of moving the stream of aerated water through the blades includes lengthening the flow pathway of the water through the water column chamber.

* * * * *